Patented June 16, 1931

1,810,723

UNITED STATES PATENT OFFICE

WILLIAM NANFELDT, OF PATERSON, NEW JERSEY, ASSIGNOR TO WORLD BESTOS CORPORATION, OF PATERSON, NEW JERSEY, A CORPORATION OF DELAWARE

TRANSMISSION LINING

No Drawing.   Application filed November 21, 1928.   Serial No. 321,037.

This invention relates to friction fabrics and more particularly to a friction fabric suitable for clutches in transmissions operating with oil.

A great deal of difficulty has been experienced in connection with friction fabrics employed in clutches operating in oil because of the gradual change in the coefficient of friction of the lining in the clutch, which is apparently due to the driving out, or absorption by the oil in the transmission of certain ingredients from the clutch facing. In machines in which the planetary type of transmission is employed, a high pedal pressure is necessitated on the clutch pedal in order to transmit power in low gear, and it frequently occurs that heavy loads cannot be carried because of the faulty transmission.

One object of the present invention is to provide a friction fabric which will be suitable for clutches operating in oil and which will maintain a substantially constant coefficient of friction even after long periods of use.

Another object of the invention is to provide a friction fabric which will be suitable for brake linings or clutches or other purposes in which the material is subjected to oil, and which will have a substantially constant coefficient of friction with the varying temperature to which the lining may be subjected.

Another object of the invention is to provide a new and useful method of making friction fabrics of the kind above referred to.

With these and other objects in view the invention comprises the various features hereinafter more fully described and more particularly set forth in the claims.

The method which I preferably employ comprises the use of asbestos yarns, which may be made from asbestos paper having a cotton thread as a core element around which the paper is wound and which is reinforced by a helically wound cotton thread. In the making of the asbestos yarns, I may, for example, employ the method set forth in my Patent No. 1,585,626 dated May 18, 1926, and friction fabric material is preferably woven from the yarn by employing two strands of cotton for each strand of the yarn, in such a manner that in the finished fabric there will be about 50% of asbestos to about 50% of cotton.

After the woven material has been made in the usual manner, it is subjected to treatment with a mixture of china wood oil dissolved in a suitable solvent such as coal tar solvent or an ester such as amyl acetate, sufficient solvent being employed to form a suitable thin solution. In connection with the solution, I preferably employ a drier in order to assist in the oxidation and polymerization of the china wood oil, and for this purpose I may, for example, employ 5 to 10% of a cobalt drier, which serves to effect the polymerization under the conditions of operation within a reasonably short period of time.

The friction fabric or lining is preferably treated by passing it into a bath of the china wood oil solution and after sufficient impregnation has taken place the lining or fabric is preferably allowed to air dry for a period of about twelve hours, so as to expel the greater part of the solvent. The fabric or lining is then preferably run through a drying oven maintained at about 350° F., whereby the china wood oil becomes oxidized or polymerized to the required hardness, resulting in cementing the yarns together and forming a tough piece of fabric. After this heat treatment resulting in polymerization, the china wood oil is not soluble in ordinary solvents and when employed as a clutch facing with oil in a transmission, there is no tendency for the china wood oil to soften or alter in composition. If the fabric or lining were used at this stage of the process it would have a low co-efficient of friction, and the oil in the transmission would have a lubricating action which would necessitate a high pedal pressure in the operation of the clutch, and would, therefore be wholly unsatisfactory.

In order now to provide the desired coefficient of friction and other characteristics or properties in the clutch facing material thus prepared, I preferably treat the friction fabric with a thin solution of a suitable wax, a combination of a vegetable wax and an animal wax being preferably employed. The wax materials which I have found best adapted for the purpose are japan wax or china wax, for the vegetable wax, and wool grease, also termed sod oil or degras, for the animal wax, which is employed in combination therewith preferably in the proportion of 50% of the japan wax with 50% of wool grease, a coal tar solvent being added in sufficient amount to form a thin solution which will penetrate the lining and serve as a vehicle to transport or cause penetration of the waxes into the treated fabric material. After the lining or fabric is then run through the wax solution to obtain substantially complete impregnation of the friction fabric, it is allowed to air dry, in order to rid the material of the solvent employed, after which the lining may be calendered in the usual way by means of friction calenders, and pressed to size. The lining may then be cut into suitable lengths and is then ready for use.

In referring to coal tar solvents as being employed to form a thin solution with the wax material, I have particular reference to that class of solvents which is obtained by direct distillation of coal tar. Such distillates derived being compounds in the benzene series, as for example, benzene, $C_6H_6$, toluene $C_6H_5CH_3$, xylene $C_6H_4(CH_3)$ etc., or being compounds closely allied thereto. In place of such coal tar solvents as these, which are preferably employed for dissolving the waxes, I may use other suitable solvents, as for example, naphthas or petroleum hydrocarbons obtained from the distillation of petroleum. These latter compounds are generally of the methane series and include hexane $C_6H_{14}$, heptane $C_7H_{16}$, octane $C_8H_{18}$, and compounds closely allied to this series.

It has been discovered in connection with the use of waxes above mentioned, that if china wood oil were not used in connection with the brake lining, and polymerized as above described, the lining would be unable to hold the waxes and would pack down and glaze; furthermore, the hot oil of the transmission would be absorbed into the pores of the lining, forcing the waxes out of the fabric, particularly when pedal pressure is applied to the clutch. It has been found essential therefore, that the china wood oil be first put into the lining and polymerized by baking or other suitable treatment before the waxes are incorporated and furthermore, that if the china wood oil were not completely polymerized before impregation with the waxes, the japan wax and wool grease would mix with the china wood oil and prevent its oxidation and polymerization.

It will be obvious that my invention may be applied to friction fabric in general, although the main use of the lining is for oil rings and clutches operating in oil for transmission purposes. It will be understood also that various changes and modifications may be made in the method and product of my invention without departing from the spirit or scope thereof as defined in the claims.

Having thus described my invention, what I claim as new is:

1. As a new article of manufacture, a friction fabric adapted for transmission lining operated in oil which is composed of woven asbestos and cotton yarns and contains polymerized china wood oil together with an impregnated vegetable wax.

2. As a new article of manufacture, a friction fabric adapted for transmission lining operated in oil and which is composed of woven asbestos and cotton yarns and contains polymerized china wood oil together with a vegetable wax and an animal wax.

3. As a new article of manufacture, a woven friction fabric adapted for transmission lining operated in oil which is composed of yarns comprising asbestos and cotton in a ratio in the woven product of about 50% of asbestos and 50% of cotton and an animal and vegetable wax combined therein with polymerized china wood oil.

4. As a new article of manufacture, a friction fabric adapted for transmission lining operated in oil which is composed of asbestos yarn, there being reinforcing cotton strands extending about said yarn, said fabric containing a polymerized china wood oil and an impregnated japan wax.

5. As a new article of manufacture, a friction fabric adapted for transmission lining operated in oil which is composed of asbestos yarn, there being a plurality of reinforcing cotton strands binding said yarn, said fabric containing approximately 50% of asbestos yarn and 50% of cotton, the fabric containing a polymerized china wood oil and an impregnated wax consisting of 50% japan wax and 50% wool grease.

6. A method for the manufacture of friction fabric adapted for use in power transmission in a clutch operating with oil, which comprises impregnating a woven asbestos fabric with china wood oil, polymerizing the china wood oil to form a hard base material capable of retaining waxes therein, and then impregnating the said base material with a wax.

7. A method for the manufacture of friction fabric adapted for use in power transmission in a clutch operating with oil, which comprises impregnating a woven asbestos fabric with china wood oil, polymerizing the china wood oil at an elevated temperature to form a porous hard base material capable of retaining waxes therein and thereafter impregnating said base material with combined japan wax and wool grease.

8. A method for the manufacture of friction fabric adapted for use in power transmission in a clutch operating with oil, which comprises weaving an asbestos fabric from asbestos and cotton yarns, impregnating the woven fabric with china wood oil dissolved in a solvent, driving off said solvent, polymerizing the china wood oil at a temperature of about 350° F., treating the friction fabric with a thin solution of a vegetable and animal wax dissolved in a solvent, driving off the solvent therefrom and calendering the resulting fabric to size.

9. A method for the manufacture of friction fabric adapted for use in power transmission in a clutch operating with oil, which comprises forming yarns from asbestos paper and reinforcing cotton strands, weaving the yarns into a fabric, thereafter impregnating the fabric with china wood oil, polymerizing the china wood oil and thereafter incorporating a wax into the product to provide the desired coefficient of friction.

10. A method for the manufacture of friction fabric adapted for use in power transmission in a clutch operating in oil, which comprises forming yarns from asbestos paper and reinforcing cotton strands, weaving the yarns with cotton strands to form a fabric, impregnating the fabric with china wood oil dissolved in a solvent, air-drying the fabric for a period of about twelve hours, subjecting the lining thereafter to a temperature of about 350° F. for a sufficient time to polymerize the china wood oil to the required hardness, treating the friction fabric so made with a solution of combined japan wax and wool grease dissolved in coal tar solvent, permitting the fabric to air dry to expel the solvent, and thereafter calendering the fabric to size.

11. As a new article of manufacture, a friction fabric adapted for transmission lining operated in oil which is composed of asbestos yarn, there being reinforcing cotton strands extending about said yarn in the proportion of two strands of cotton to one strand of asbestos yarn, said fabric containing a polymerized china wood oil and an impregnated japan wax.

12. As a new article of manufacture, a friction fabric adapted for transmission lining operated in oil which is composed of a fibrous material and contains polymerized china wood oil together with a vegetable wax and an animal wax.

In testimony whereof, I affix my signature.

WILLIAM NANFELDT.